United States Patent
Priske et al.

(10) Patent No.: US 8,969,628 B2
(45) Date of Patent: Mar. 3, 2015

(54) METHOD FOR ENRICHING A HOMOGENEOUS CATALYST FROM A PROCESS FLOW

(75) Inventors: Markus Priske, Marl (DE); Goetz Baumgarten, Haltern am See (DE); Hans-Gerd Lueken, Marl (DE); Alfred Kaizik, Marl (DE); Klaus-Diether Wiese, Haltern am See (DE); Uwe Ernst, Marl (DE); Patrick Muhlack, Recklinghausen (DE)

(73) Assignee: Evonik Degussa GmbH, Essen (DE)

( * ) Notice: Subject to any disclaimer, the term of this patent is extended or adjusted under 35 U.S.C. 154(b) by 707 days.

(21) Appl. No.: 13/203,639

(22) PCT Filed: Feb. 23, 2010

(86) PCT No.: PCT/EP2010/052242
§ 371 (c)(1),
(2), (4) Date: Oct. 4, 2011

(87) PCT Pub. No.: WO2010/097376
PCT Pub. Date: Sep. 2, 2010

(65) Prior Publication Data
US 2012/0046503 A1  Feb. 23, 2012

(30) Foreign Application Priority Data
Feb. 27, 2009 (DE) .......................... 10 2009 001 225

(51) Int. Cl.
C07C 45/00 (2006.01)
B01J 31/40 (2006.01)
B01J 31/18 (2006.01)

(52) U.S. Cl.
CPC ............ B01J 31/4046 (2013.01); B01J 31/185 (2013.01); *B01J 2231/321* (2013.01); *B01J 2531/822* (2013.01)
USPC ........... 568/451; 568/426; 568/454; 568/455; 210/637; 210/650; 210/651

(58) Field of Classification Search
CPC ...... C07C 45/28; C07C 45/50; B01D 61/145; B01D 61/18
USPC .......... 568/426, 451, 454, 455; 210/637, 650, 210/651
See application file for complete search history.

(56) References Cited

U.S. PATENT DOCUMENTS

| | | |
|---|---|---|
| 4,759,776 A | 7/1988 | Langsam et al. |
| 4,978,726 A | 12/1990 | Döhler et al. |
| 5,145,915 A | 9/1992 | Weitemeyer et al. |
| 5,146,005 A | 9/1992 | Weitemeyer et al. |
| 5,260,402 A | 11/1993 | Weitemeyer et al. |
| 6,015,928 A | 1/2000 | Gubisch et al. |
| 6,211,322 B1 | 4/2001 | Döhler et al. |
| 6,268,404 B1 | 7/2001 | Döhler et al. |
| 6,310,261 B1 | 10/2001 | Geissler et al. |
| 7,250,204 B2 | 7/2007 | Brand et al. |
| 7,276,541 B2 | 10/2007 | Döhler et al. |
| 7,598,334 B2 | 10/2009 | Ferenz et al. |
| 7,605,284 B2 | 10/2009 | Brueckner et al. |
| 7,635,581 B2 | 12/2009 | Ferenz et al. |
| 7,727,599 B2 | 6/2010 | Doehler et al. |
| 7,759,402 B2 | 7/2010 | Venzmer et al. |
| 7,776,989 B2 | 8/2010 | Ferenz et al. |
| 7,838,603 B2 | 11/2010 | Schwab et al. |
| 7,838,614 B2 | 11/2010 | Thum et al. |
| 7,855,265 B2 | 12/2010 | Thum et al. |
| 7,893,128 B2 | 2/2011 | Busch et al. |
| 8,021,632 B2 | 9/2011 | Baumgarten et al. |
| 8,138,294 B2 | 3/2012 | Henning et al. |
| 8,172,936 B2 | 5/2012 | Herrwerth et al. |
| 8,198,473 B2 | 6/2012 | Ferenz et al. |
| 8,211,972 B2 | 7/2012 | Meyer et al. |
| 8,226,829 B2 | 7/2012 | Wiese et al. |
| 8,389,774 B2 | 3/2013 | Becker et al. |
| 2005/0136269 A1 | 6/2005 | Doehler et al. |
| 2005/0182277 A1 | 8/2005 | Totsch et al. |
| 2005/0234270 A1 | 10/2005 | Kaizik et al. |
| 2006/0155090 A1 | 7/2006 | Ferenz |
| 2006/0246273 A1* | 11/2006 | McKeown et al. ......... 428/314.8 |
| 2007/0059539 A1 | 3/2007 | Doehler et al. |

(Continued)

FOREIGN PATENT DOCUMENTS

| | | |
|---|---|---|
| DE | 198 01 437 | 7/1999 |
| DE | 10 2005 046 250 | 3/2007 |

(Continued)

OTHER PUBLICATIONS

U.S. Appl. No. 13/513,225, filed Jun. 1, 2012, Haensel, et al.
U.S. Appl. No. 14/343,917, filed Mar. 10, 2014, Hamers, et al.
McKeown, N. B. et al., "Polymers of Intrinsic Microporosity (PIMs): Bridging the Void Between Microporous and Polymeric Materials", Chemistry—A European Journal, vol. 11, No. 9, pp. 2610-2620, XP-002493889, (Apr. 22, 2005).
International Search Report Issued Jun. 7, 2010 in PCT/EP10/052242 filed Feb. 23, 2010.

*Primary Examiner* — Sudhakar Katakam
(74) *Attorney, Agent, or Firm* — Oblon, Spivak, McClelland, Maier & Neustadt, L.L.P.

(57) ABSTRACT

The invention relates to a method for enriching a homogenous catalyst from a process flow comprising said homogenous catalyst as a component, wherein the process flow is conducted over at least one membrane and wherein the membrane wholly or partially comprises a polymer that has planar polymer units connected to one another via a rigid link and wherein the linker is contorted, such that at least one planar polymer unit is connected to at least one second planar polymer unit via the link, in a non-co-planar arrangement. The invention furthermore relates to a method for producing tridecanal.

18 Claims, 3 Drawing Sheets

(56) References Cited

U.S. PATENT DOCUMENTS

| | | |
|---|---|---|
| 2007/0123599 A1 | 5/2007 | Eilbracht et al. |
| 2007/0149723 A1 | 6/2007 | Schwab |
| 2007/0197678 A1 | 8/2007 | Cavaleiro et al. |
| 2007/0295243 A1 | 12/2007 | Dohler et al. |
| 2007/0299231 A1 | 12/2007 | Doehler et al. |
| 2008/0187702 A1 | 8/2008 | Ferenz et al. |
| 2008/0251456 A1* | 10/2008 | Wiese et al. ............ 210/637 |
| 2009/0032465 A1 | 2/2009 | Baumgarten et al. |
| 2009/0136757 A1 | 5/2009 | Wursche et al. |
| 2010/0036011 A1 | 2/2010 | De Gans et al. |
| 2010/0187174 A1 | 7/2010 | Wursche et al. |
| 2010/0210445 A1 | 8/2010 | Von Rymon Lipinski et al. |
| 2010/0248325 A1 | 9/2010 | Eckstein et al. |
| 2010/0266651 A1 | 10/2010 | Czech et al. |
| 2010/0298485 A1 | 11/2010 | Frey et al. |
| 2011/0042004 A1 | 2/2011 | Schubert et al. |
| 2011/0046305 A1 | 2/2011 | Schubert et al. |
| 2011/0070175 A1 | 3/2011 | Herrwerth et al. |
| 2011/0091399 A1 | 4/2011 | Meyer et al. |
| 2011/0230619 A1 | 9/2011 | Kuppert et al. |
| 2011/0230633 A1 | 9/2011 | Ferenz et al. |
| 2011/0251070 A1 | 10/2011 | Poffenberger et al. |
| 2011/0268642 A1 | 11/2011 | Brausch et al. |
| 2012/0010302 A1 | 1/2012 | Hartung et al. |
| 2012/0035382 A1 | 2/2012 | Priske et al. |

FOREIGN PATENT DOCUMENTS

| | | |
|---|---|---|
| DE | 10 2005 060 784 | 6/2007 |
| DE | 10 2006 003 618 | 8/2007 |
| EP | 0 850 905 | 7/1998 |
| SU | 1741609 A3 | 6/1992 |
| WO | 03 095402 | 11/2003 |
| WO | 03 095406 | 11/2003 |

* cited by examiner

METHOD FOR ENRICHING A HOMOGENEOUS CATALYST FROM A PROCESS FLOW

BACKGROUND OF THE INVENTION

1. Field of the Invention

The present invention relates to a method of concentrating a homogeneous catalyst from a process stream which contains this homogeneous catalyst as constituent. To concentrate the catalyst, the process stream is passed over at least one membrane.

2. Description of the Background

Catalyst systems used in homogeneous catalysis generally have to be removed entirely or partly from the respective reaction mixture. Reasons for this can be product purity requirements or the recovery of the catalyst system as a material of value which can be, for example, recirculated directly or indirectly to the reaction.

Particularly when using transition metal complexes such as rhodium as catalyst or when using expensive ligands, separating off the catalyst system is an important process step because of the catalyst costs. Industrial processes which are carried out using transition metal complexes in a homogeneous phase are, for example, telomerizations, metatheses, hydrogenations or hydroformylations. Reactions using rhodium complexes are widespread industrially and associated with relatively high catalyst costs.

Rhodium complexes are used as catalyst in, for example, the industrial hydroformylation of olefins to form the aldehydes and/or alcohols having one more carbon atom. In particular, rhodium complexes having phosphine, phospite, phosphonite or phosphinite ligands are used as catalyst here.

The way in which the catalyst is separated off can have a significant influence on the economics of the overall process. The separation of the catalyst from the reaction mixture can in the simplest way be carried out exclusively by means of thermal separation processes, for example by separating off the reaction product and if appropriate starting material from the catalyst-containing reaction mixture by evaporation. The disadvantage of such processes is that the catalyst and/or the ligand can decompose during the distillation. The catalyst decomposition products in the distillation residude can frequently not be converted into an active catalyst system in the process. They therefore have to be discharged and be worked up in a complicated manner before recirculation to the process. This applies in particular to the work-up of hydroformylation mixtures which comprise rhodium complexes having ligands which complex the rhodium less strongly than phosphines as catalysts. In the distillation, these ligand complexes can decompose because of the lack of stabilization by carbon monoxide, which can lead to formation of rhodium clusters. The rhodium clusters cannot be converted into the active catalyst under hydroformylation conditions. In addition, partial decomposition of the ligands can occur during the distillation.

A potential way of separating off homogeneous catalyst systems under mild conditions is concentration of process streams containing homogeneous catalyst by means of membranes in a single-stage or multistage arrangement.

EP 0 781 166 describes the separation of dissolved rhodium-organophosphite complex catalyst and free ligand from a nonaqueous hydroformylation reaction mixture over a membrane to an extent of at least 90% by mass of the catalyst and the free ligand. Membrane polymers mentioned are Teflon, polydimethylsiloxane (PDMS), polyethylene, polyisobutadiene, polystyrene, polymethyl methacrylate, polyvinyl chloride, cellulose diacetate, polyvinylidene chloride and polyacrylonitrile. The separation of the high boilers from the catalyst system is not described.

EP 1 232 008 describes the separation of high boilers from a catalyst recycle stream by means of a membrane (PDMS). The recycle stream arises in the work-up by distillation of an output from a reaction catalyzed by a metal-organic catalyst. Here, starting materials and the primary products are distilled off and a high boiler mixture in which the catalyst system is dissolved remains as bottom product. This is recirculated to the reactor. Since small amounts of high boilers are formed in the process, part of the high boilers have to be separated off from the bottom product in order to keep the concentration of high boilers constant. In EP 1 232 008, the high boilers are separated off from the bottom product with addition of a diluent. The diluent is added in such an amount that the proportion of high boilers in the solution which is fed to the membrane is less than 50% by mass. The high boilers are separated off in the temperature range from to $50°$ C. and in the pressure range from 0.1 to 10 MPa. The addition of diluents is disadvantageous because the amount of material passed over the membrane is increased. Furthermore, part of the added diluent is separated off with the high boilers, thus incurring costs for the diluent or for the recovery therefrom.

DE 10 2005 046250 describes a method of separating off a metal-organic catalyst system. Here, the organic reaction output is, in a first step, separated into a retentate containing the major part of the catalyst system and a permeate comprising starting materials, primary products, high boilers and catalyst system. The retentate is recirculated directly to the reactor. The permeate is separated by distillation into an overhead product which contains mainly starting materials and primary reaction products and a bottom product containing the catalyst system dissolved in high boilers. This document also discloses, as optional work-up variant, separating off part of the high boilers by means of a membrane from the bottom product before it is recirculated to the reactor. Principle membrane materials which can be used are stated as being polydimethylsiloxane (PDMS), polyimide (PI), polyamide imide (PAI), acrylonitrile/glycidyl methacrylate (PANGMA), polyamide (PA), polyether ether ketone (PEEK), polymers having intrinsic microporosity (PIM) and hydrophobized ceramic membranes. However, no details are given for the high boiler removal by means of membranes, for example membrane types which can be used.

DE 10 2005 060784 A1 describes a method of recovering a stream enriched in a metal complex catalyst (>200 dalton). The reactor output is separated by distillation into a low-boiling stream and a higher-boiling bottom stream containing the catalyst. The bottom stream is separated by means of membrane in a permeate stream and a catalyst-enriched retentate stream which is entirely or partly recirculated to the reaction. Only ceramic membranes having a separation limit (MWCO) of over 500 dalton and polymer membranes having separation limits over 10 000 dalton are indicated. Nothing is said about the activity as an important measure for the quality of the retained catalyst system.

The catalyst mentioned by way of example has a molecular weight of about 12 000 dalton and is therefore more than an order of magnitude larger than the conventional catalysts used in industry. The disclosure of DE 10 2005 060784 A1 cannot be applied to industrially relevant catalyst systems having a smaller molecular weight.

In addition, the retention on which the separation limit is based and the system for which the separation limit was determined are not stated. The information given is usually based, depending on the manufacturer, on a retention of 90 or 95%. The separation limit does not serve as absolute limit but as qualitative aid for selecting a membrane for a specific separation problem (see Melin, Rautenbach: Membranverfahren, second edition, 2004, Springer-Verlag Berlin, Heidelberg). It is therefore questionable whether the separation limits indicated apply to the metal complex catalyst. The necessity of retaining the ligand is not mentioned.

The membranes listed are exclusively porous membranes whose separation limits are, as shown below, not suitable for the process-relevant catalyst system. For the membranes listed, apart from various ceramic membranes only polytetrafluoroethylene, polyvinylidene fluoride (PVDF), polysulfone, polyether sulfone, polydimethylsiloxane (PDMS), polyether ketone, polyamide and polyimide are mentioned as possible membrane materials.

US 2006/0246273 A1 discloses a novel polymer having intrinsic microporosity (PIM). Owing to the rigid spiro bond, this polymer or polymer mixtures based thereon have a large free volume within the polymer matrix. The polymer can potentially be used for the separation or enrichment of gas, vapor or liquid mixtures. Owing to the high free volume, the polymer can be particularly advantageously used as membrane material for gas separation. Fritsch et al. (J. Mem. Sci. 251, 263-269 (2005)) achieve comparatively high permeabilities.

Apart from gas separation, PIM-based membranes can potentially also be used for the separation of chiral molecules such as amino acids, for the separation of organics, e.g. alcohol, from aqueous systems, for isomer separation, in pharmacy and biotechnology for the separation of proteins or other thermally unstable components, in fermenters and bioreactors for introduction of gas and biomass removal and also for the removal of microorganisms from air and water.

Further potential use opportunities are water purification, the detection or removal of trace components or metal salts from air or water, the separation of liquid mixtures by means of pervaporation (e.g. in ethanol production) and gas/vapor separation (e.g. separation of organic vapors from gas) and the liquid-liquid separation of organic components or improving the yield in equilibrium reactions by selective product discharge. The isolation of dissolved solids such as homogeneous catalysts is not described. Furthermore, the membrane thicknesses of from 10 to 500 μm which are indicated are too thick for the desired separation task.

WO 2005/113121 A1 describes the production of composite membranes having a thin layer of a microporous material having a high intrinsic microporosity. Apart from production of the membrane, possible uses of the membrane, e.g. fluid separation and the separation of low molecular weight solids from fluids, are mentioned. Mention is also made of the separation of hydrogen and hydrocarbons, $N_2$ or CO, the separation of $CO_2$, $H_2O$ and $H_2S$ from natural gas, the separation of nitrogen and oxygen, the separation of VOCs (volatile organic compounds) and other lower hydrocarbons from air and other gases, the separation of traces of organic components from aqueous streams and also the separation of low molecular weight components and oligomers from fluids and especially from solvents.

A disadvantage of the methods known from the prior art is that the methods either cannot separate off the catalyst system under sufficiently mild conditions and therefore with retention of activity and/or the active catalyst systems cannot be retained to a sufficient extent. Particularly in the retention of an active catalyst system having a molar mass below 1500 g/mol, which is significantly lower than that of clustered catalyst species, there is the difficulty of separating components having a molar mass difference of less than 100 g/mol from one another using a membrane. At the same time, the membrane has to be sufficiently permeable for organic components to allow an economical process.

Since no satisfactory solution is known for the concentration of a catalyst system under mild conditions from process streams from the hydroformylation of higher olefins (C4 and higher), where the catalyst system comprises the metal complex catalyst and clusters thereof and also the free ligand, it is an object of the invention to develop a method which separates the process stream containing the catalyst system (e.g. reactor output or bottom product) into a stream enriched in the catalyst system and a stream depleted in the catalyst system and has a high degree of retention for the catalyst system, in particular for the metal component.

The technical object of the invention is therefore to provide a method of concentrating a homogeneous catalyst, in which the catalyst system can be concentrated or separated off while retaining its activity, with the method having to have a high degree of retention for the catalyst system, requiring no diluents for the recovery and also displaying no clustering of the metal component of the catalyst or decomposition of the catalyst complex.

SUMMARY OF THE INVENTION

This technical object is achieved by a method of concentrating a homogeneous catalyst from a process stream containing this homogeneous catalyst as constituent, wherein the process stream is passed over at least one membrane and the membrane consists entirely or partially of a polymer comprising planar polymer units which are connected to one another via a rigid linker, with the linker being intrinsically twisted so that at least one planar monomer unit is joined via the linker in a noncoplanar arrangement to at least one second planar polymer unit.

These polymers will hereinafter be referred to as polymers having intrinsic microporosity (PIM).

DETAILED DESCRIPTION OF THE INVENTION

Figure 1:
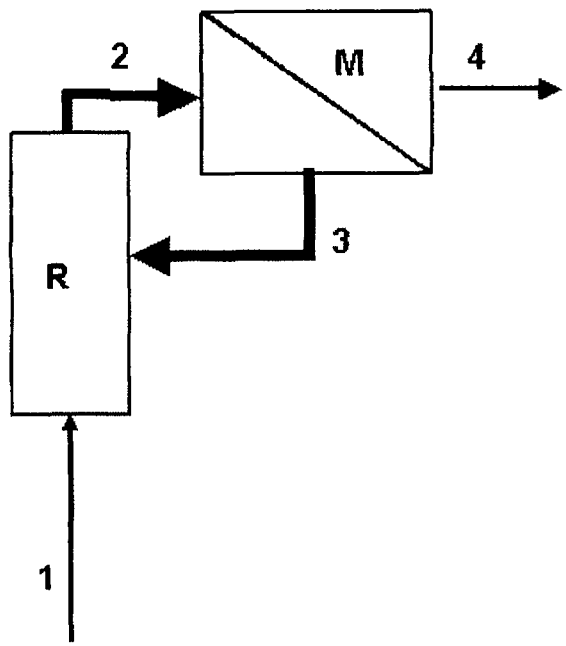
FIG. 1 is a block diagram of a method according to an embodiment of the invention in which the homogenous catalyst is treated after catalyzing a hydroformylation.

It has surprisingly been found that both in the case of an organic reaction output from a metal-catalyzed reaction and also in the case of distillation bottoms which have been produced from the reaction output and are enriched with high boilers and contain high boilers, metal complexes, clusters thereof and also free ligands, it is possible to separate high boilers, product and starting materials from the catalyst system by means of one or more membrane(s), with the retention for the metal component per membrane being greater than 70% and that for the free ligands being greater than 60%, when the separation is carried out over membranes containing polymers having intrinsic microporosity (PIM).

The method is preferably carried out at a separation limit of from 400 to 2000 g/mol in the temperature range from 40 to 150° C. and in a range of the transmembrane pressure (differential pressure across the membrane) of from 5 to 60 bar.

Even at concentrations of high boilers of over 50% by mass, no addition of a diluent is necessary since even at high concentrations of high boilers, the permeate flow and the selectivity of the separation is sufficiently high for industrial implementation. It is surprising that catalyst complexes whose molar masses are of the same order of magnitude as those of the high boilers can be retained better than the high boilers using membranes based on PIM.

For the purposes of the invention, high boilers are materials which have a boiling point higher than those of the primary hydroformylation products (aldehydes and/or alcohols having one carbon atom more than the olefin used) and have higher molar masses and are formed during the hydroformylation. These include aldolization products and acetalation products and esters formed by reaction of alcohols and acids, with the alcohols and acids being formed by disproportionation of aldehydes. High boilers which are present in the process streams from the hydroformylation generally have boiling points above 55° C. at 0.1 MPa.

In a preferred embodiment, the polymers have spirobisindane bonds which function as linkers within the polymer structures.

In a preferred embodiment, the polymers have substituted or unsubstituted spirobis[indane] substructures which function as linkers within the 15 polymer structures.

Spirobisindane bonds are, for the purposes of the invention, 1,1'-spirobis[indane], 1,2'-spirobis[indane] and 2,2'-spirobis[indane]; the structures thereof can be depicted as follows:

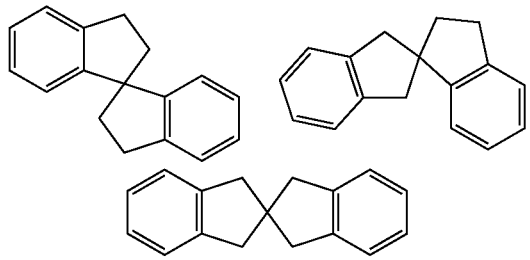

The spirobisindane bond is not a chemical bond in the narrow sense but rather a substructure arranged between the polymers.

A very particularly preferred spirobisindane bond is the substructure 3,3,3',3'-tetramethyl-1,1'-spirobis[indane]:

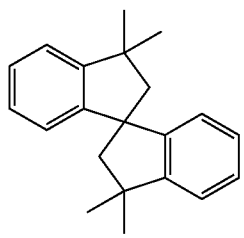 [SMILES: CC1(C)CC2(CC(C)(C)c3ccccc32)c2ccccc21]

As separation-active membrane material, particular preference is given to polymers which have repeating units of one or more of the following formulae, where n indicates the number of units and is preferably in the range from 10 to 100 000.

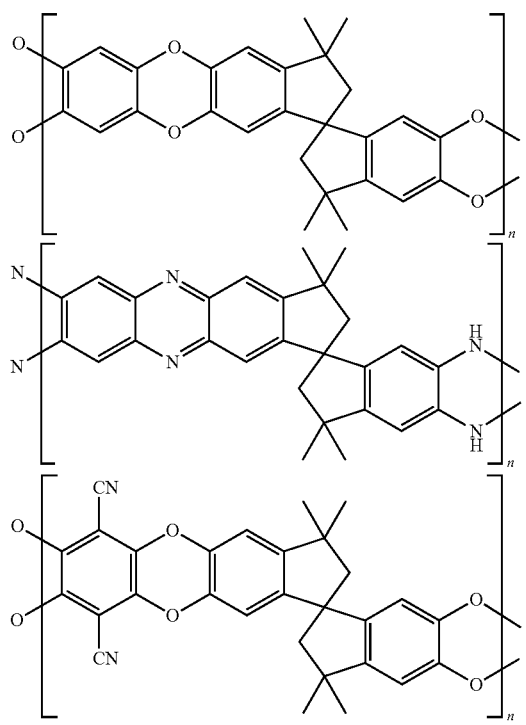

The above polymers will hereinafter be referred to as PIMs (polymers having intrinsic microporosity).

For the purposes of the invention, concentration encompasses not only concentration of the homogeneous catalyst but also complete separation of the homogeneous catalyst from the process stream.

It is advantageous that PIM-based membranes have, compared to membranes used hitherto, a particularly high retention of solids such as homogeneous catalysts and their ligands dissolved in organic solvents and at the same time display a high permeate flux.

Furthermore, a particularly mild separation can be achieved for the catalyst system when the catalyst system is, ideally, worked up in the presence of carbon monoxide and hydrogen since the clustering process can additionally be avoided in this way. Blanketing with carbon monoxide and also with hydrogen is possible particularly in the case of membrane separation.

The amount of synthesis gas blanketing the solution during the separation should be at least the stoichiometric amount required for formation of the active catalyst species so as to be able to avoid formation of inactive or even irreversibly precipitated catalyst species.

Membrane Arrangement

The method of the invention can be carried out using one, two or more membrane(s) or using one, two or more membrane separation steps. Depending on the separating power of the membrane and the desired retention, the desired retention can be achieved by connecting a plurality of membrane separation steps in series. In the method of the invention, it is possible to carry out, in particular, two or more membrane separation steps. The membrane separation steps can be carried out directly in succession. The connection in series can be achieved by either the retentate or the permeate, preferably the permeate, from a first membrane separation step being used as feed stream in a further membrane separation step. Any membrane separation steps following the first membrane separation step according to the invention can likewise be carried out under similar conditions as the first. One membrane or a plurality of membranes can be used in a membrane separation step. Preference is given to using two or more membranes in a membrane separation step.

In a multistage membrane separation process, it can be advantageous to use different membranes in the membrane separation steps. Thus, a more permeable membrane is preferably used in a membrane separation step preceding another membrane separation step. The classification occurring as a result leads to a better permeability in the next membrane separation step.

In the method of the invention, the upper temperature limit in the membrane separation steps is determined by the stability of the membranes used and the stability of the catalyst system. The lower temperature limit is dependent on the viscosity of the solution to be separated and the temperature-dependent solubility of the catalyst system therein. In the method of the invention, a membrane separation step, in particular the first membrane separation step, is preferably carried out at a temperature of from 40 to 150° C., particularly preferably at a temperature of from 60 to 90° C. If reaction mixtures obtained in the hydroformylation of $C_{12}$-olefins are used in the method of the invention for the separation of catalysts from hydroformylation reaction mixtures, the membrane step, in particular the first membrane step, is preferably carried out at a temperature of from 60 to 90° C. If reaction mixtures obtained in the hydroformylation of $C_8$-olefins are used in the method of the invention for the separation of catalysts from hydroformylation reaction mixtures, the membrane step, in particular the first membrane step, is preferably carried out at a temperature of from 40 to 80° C. Carrying out the method of the invention at the preferred temperatures can, firstly, result in a higher flux through the membrane. Secondly, adherence to the abovementioned preferred temperature ranges avoids decomposition of the catalyst, which can otherwise lead to losses of active catalyst and to deposition of decomposition products of the catalyst on the membrane. Such deposition can reduce the flow through the membrane. In an extreme case, the flow can cease entirely due to blockage.

The transmembrane pressure (pressure across the membrane between retentate side and permeate side) at which the method of the invention is preferably carried out is preferably from 5 to 60 bar, particularly preferably from 10 to 30 bar.

The method of the invention can be carried out using PIM membranes which, owing to their chemical or physical properties, are suitable for retaining metal complex catalysts, in particular phosphorus-organic metal complex catalysts, to a degree of at least 60%, in particular more than 80%, and have a separation limit of from 400 to 2000 g/mol. A further prerequisite for usability of the membrane is that the membrane has to be stable to all compounds present in the reaction mixture, in particular to the solvents.

PIM

For the purposes of the present invention, the term microporous encompasses materials which could be referred to as nanoporous. There have hitherto been two classes of intrinsically microporous materials, viz. zeolites and amorphous activated carbon. Owing to the lack of solubility in organic solvents, it is not possible to produce films and thus also not possible to produce membranes from these materials. The situation is different in the case of polymers.

For the purposes of the present invention, a PIM (polymer having intrinsic microporosity) is a polymer of a recently developed class of polymers which is preferably characterized by a rigid spirobisindane bond which effects twisting within the polymer structure. The random distribution of the spiro bond prevents densification of the polymer. The rigid twisting (of the planar polymer chains) at the spirobisindane bond leads to a high proportion of free interconnected volumes. The microporosity is referred to as intrinsic since it occurs independently of thermal pretreatment and the processing of the polymer.

An example of a polymer having intrinsic microporosity is PIM-1. PIM-1 is one of the first polymers synthesized in this class of polymers. The CA index name is 1,4-benzenedicarbonitrile, 2,3,5,6-tetrafluoro polymer with 2,2',3,3'-tetrahydro-3,3,3',3'-tetramethyl-1,1'-spirobis[1H-indene]-5,5',6,6'-tetrol having the number CA is obtained from the reaction of 676450-48-9. PIM-1 5,5'6,6'-tetrahydroxy-3,3,3',3'-tetramethyl-1,1'-spirobisindan with 2,3,5,6-tetrafluorophthalonitrile:

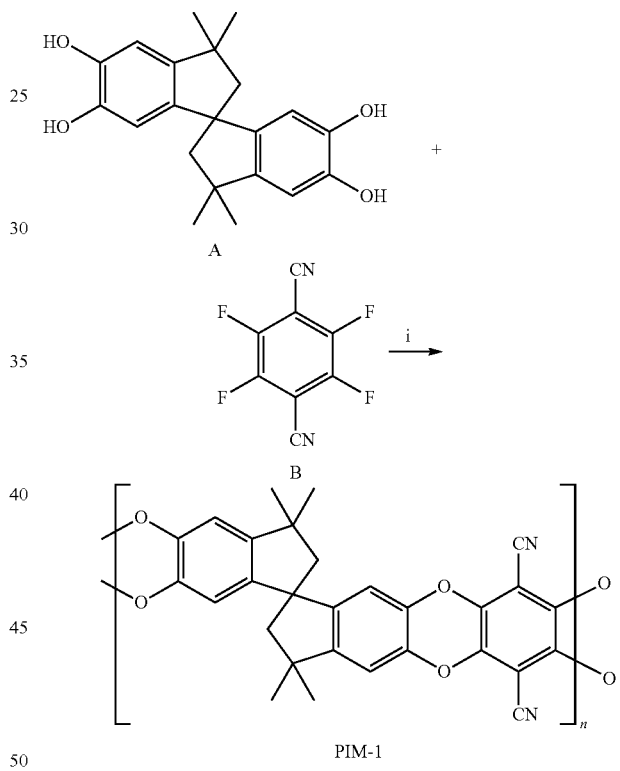

Further examples of polymers having intrinsic microporosity are given in US2006/0246273A1 and in WO2005/113121.

Additional examples of copolymers which are suitable for modifying PIM-1 are:

Comonomer 1

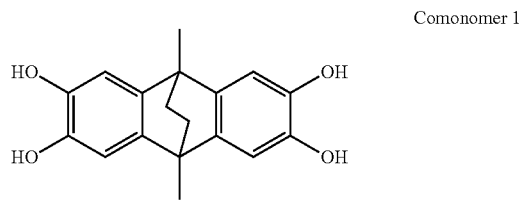

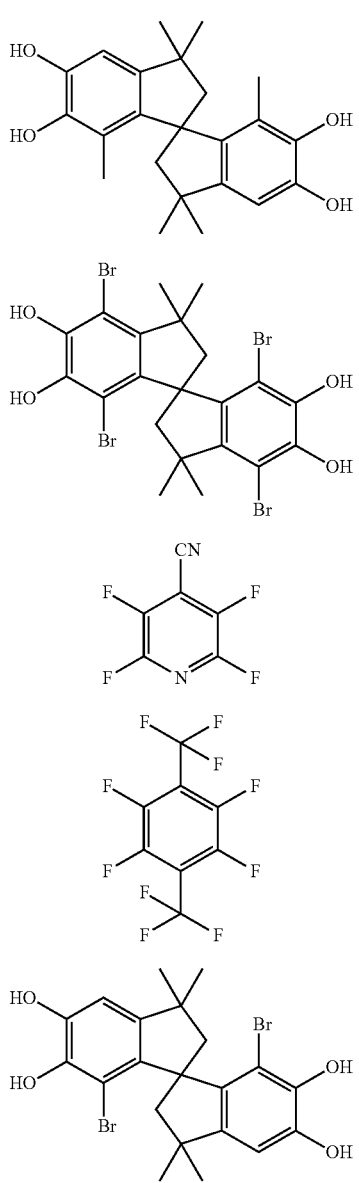

Comonomer 2

Comonomer 3

Comonomer 4

Comonomer 5

Comonomer 6

Comonomer 3 is produced by bromination of spirobisindane.

Further examples of starting substances are 9,9'-spirobifluorene, modified as 2,2'-dicarboxy-9,9'-spirofluorene or 2,2'-diamino-9,9'-spirobifluorene, which are suitable for producing intrinsically microporous polyamides and polyimides.

Apart from the abovementioned polymers having intrinsic microporosity, the membranes can comprise further materials. In particular, the membranes can comprise support materials onto which the PIM is applied as a thin, separation-active layer. In such composite membranes, a support material is present in addition to the actual membrane. A selection of support materials is described in EP 0 781 166, which is expressly incorporated by reference. Furthermore, reinforcing materials, e.g. particles of inorganic oxides or inorganic fibers such as ceramic or glass fibers which increase the stability of the membrane, in particular to pressure fluctuations or high pressure differences, can be present in the membranes which can be used according to the invention. The thickness of the separation layer of the membrane for the method of to invention is preferably 10-1000 nm, particularly preferably 100-700 nm.

Industrial Modules

In the method of the invention, the membranes are preferably used in the form of membrane modules. In these modules, the membranes are arranged so that the solution can flow over the retentate side of the membrane in such a way that the concentration polarization acts counter to the components separated off, here catalyst-ligand system, and in addition the necessary driving force (pressure) can be applied. The permeate is combined in the permeate collection space on the permeate side of the membrane and discharged from the module. Customary membrane modules have the membrane in the form of membrane disks, membrane cushions or membrane pockets. In the method of the invention, the membranes are preferably used in the form of membrane modules having open-channel cushion module systems in which the membranes are thermally welded or adhesively bonded to form membrane pockets or cushions or open-channel (widespacer) wound modules in which the membranes are adhesively bonded or welded to form membrane pockets or membrane cushions and are wound up with feed spacers around a permeate collection tube.

Flow Over the Membrane, Separation Step

To avoid deposits on the membrane, particular flow conditions have to be adhered to within the membrane separation steps. It has been found that the risk of deposits in a stream is dependent on its turbulence and thus on its Reynolds number. Thus, it has to be ensured, taking into account the construction of the membrane module, that the Reynolds number is in the range from 55 to 13 500, preferably from 100 to 3500 and very particularly preferably from 170 to 900. The kinematic viscosity should be less than 10 mPas and preferably be 1 mPas. Under these flow conditions, deposits are avoided.

When using wound membranes having a tube length of 1 m and a pressure drop of 1.5 bar and a kinematic viscosity of the medium of 1 mPas, these flow conditions are implemented by preferably carrying out the method in such a way that the flow velocity over the membrane is from 0.1 to 15 m/sec, preferably from 0.2 to 4 m/sec, more preferably from 0.3 to 1 m/sec, in the membrane separation step, in particular the first membrane separation step, in order to avoid deposits on the membrane.

The method of the invention is preferably carried out by feeding the solution to be separated as feed stream to the membrane and recirculating part of the retentate stream to the membrane. Here, the substream which is recirculated to the membrane is combined beforehand with the solution to be separated. The part of the retenate stream which is not recirculated to the membrane is either used as feed stream to one or more subsequent separation stages or else recirculated to the reaction.

If a stream having a low proportion of high boilers and a high proportion of primary products, as is the case for a reactor output without previous concentration of high boilers, is fed to the membrane separation step, the volume flow ratio of permeate stream to feed stream from the reactor (without recirculated retentate) is from 1:1.1 to 1:5, preferably from 1:1.4 to 1:3 and particularly preferably from 1:1.6 to 1:2.

If, conversely, a stream which has been significantly enriched in high boilers compared to the reactor output, e.g. by means of a thermal separation step, after the reactor is fed to the membrane separation step, the volume flow ratio of permeate stream to feed stream from the reactor (without recirclated retentate) is preferably from 1:5 to 1:20, preferably from 1:7.5 to 1:12.5 and particularly preferably from 1:9 to 1:11.

It can be advantageous for the volume flow over the membrane to be significantly greater than the volume of flow of the permeate stream, since a high flow velocity over the membrane can be set in this simple way. The volume flow ratio of the stream supplied to the membrane, in particular to the first membrane or the first membrane separation step (inflow from the reactor including recirculated retentate), to permeate flow is preferably 10-10 00:1, more preferably 50-5000:1 and particularly preferably 200-2000:1. Preference is thus given to circulating a relatively high volume flow over the membrane. The magnitude of the part of the retentate stream which is recirculated to the reaction or fed to a further separation is given by the difference between feed stream (without recirculated retentate) and permeate stream.

In the case of relatively high permeabilities, it can also be advantageous to connect the membranes in a "fir tree" structure.

As feed stream to the membrane separation, it is possible to use the reaction output from a reaction catalyzed by organic metal complexes, either directly or in the way of a concentrate produced therefrom. The reaction outputs contain starting materials, primary products, by-products such as high boilers, the catalyst system and, if used, a solvent. When this mixture is worked up according to the invention, the catalyst system, in particular the metal complex, remains predominantly in the retentate. Starting materials, products and high boilers are separated off together in the permeate which is worked up in a further separation stage. In this case, the permeate stream is substantially larger than the retentate stream which is not recirculated to the membrane. This requires a large membrane surface and nonoptimum retention of the catalyst system.

The major part of the starting materials and products are therefore preferably separated off beforehand by means of a thermal separation step. Such a thermal separation step can be realized, for example, by means of one or more thermal separation apparatuses such as thin film evaporators, falling film evaporators, flash evaporators for distillation columns. Essentially starting materials and primary products are here separated off as overhead product. A mixture of high boilers and the catalyst system is obtained as bottom product. If the reaction mixture is a hydroformylation mixture, the overhead product usually contains the hydroformylation product, e.g. aldehyde and/or alcohol and possibly unreacted hydrocarbons such as olefins or aliphatics and any solvent used in the hydroformylation which has a boiling point in the region of that of the hydroformylation products or below and can be passed to a further work-up. The bottom product obtained from the thermal separation step is a mixture containing the complex catalyst and/or free ligands, if used a solvent having a boiling point higher than that of the hydroformylation product and also high boilers formed during the hydroformylation.

The proportion of high boilers in the bottom product is, depending on the reaction conditions and starting material, in the range from 50 to 98% by mass, in particular from 60 to 90% by mass. These solutions can be fed without addition of a diluent to the membrane separation.

Before the thermal separation step, the reaction mixture can optionally be separated by means of a membrane into a stream having a higher catalyst concentration and a stream having a lower catalyst concentration. The stream having the higher catalyst concentration is recirculated to the reactor. The stream having the lower catalyst concentration is fed to the thermal separation step. A method of this type is described, for example, in DE 10 2005 046250.2.

Mixtures formed in reaction using homogeneously dissolved metal catalysts can be separated by means of the present invention.

As examples of such reactions, mention may be made of hydrogenations, hydroformylations, metatheses, hydrocyanations and hydrocarboxyalkylations of olefins. Preference is given to working up hydroformylation mixtures containing rhodium complex catalysts.

The hydroformylation reaction mixtures can come from processes for the hydroformylation of olefins, preferably having from 2 to 25 carbon atoms, particularly preferably from 4 to 16 carbon atoms, very particularly preferably from 6 to 12 carbon atoms and in particular 8, 9, 10, 11 or 12 carbon atoms, to form the corresponding aldehydes. The hydroformylation reaction mixture very particularly preferably comprises, as hydroformylation product, an aldehyde selected from among aldehydes having from 5 to 17 carbon atoms, preferably 9 or 13 carbon atoms, in particular isononanal and isotridecanal.

The complex catalysts and/or free organophosphorus ligands present in the hydroformylation reaction mixture can be the compounds and complexes known from the prior art. The complex catalysts or the free ligands preferably have ligands selected from among phosphines, phosphites, phosphinites, phosphonites. The ligands can have one or more phosphino, phosphito, phosphonito or phosphinito groups. It is likewise possible for the ligands to have two or more different groups selected from among phosphino, phosphito, phosphonito and phosphinito groups. In particular, the ligands can be bisphosphites, bisphosphines, bisphosphonites, bisphosphinites, phosphine-phosphites, phosphine-phosphonites, phosphine-phosphinites, phosphite-phosphonites, phosphite-phosphinites or phosphonite-phosphinites. The ligands of the complex catalyst and the free ligands can be identical or different. The organophosphorus ligands of the complex catalyst and the free ligands are preferably identical.

Examples of complex catalysts and ligands which can be used and the preparation and use thereof in hydroformylation may be found, for example, in EP 0 213 639, EP 0 214 622, EP 0 155 508, EP 0 781 166, EP 1209164, EP 1201675, DE 10114868, DE 10140083, DE 10140086, DE 10210918 or WO 2003/078444, which are expressly incorporated by reference.

Examples of preferred ligands are:
phosphines: triphenylphosphine, tris(p-tolyl)phosphine, tris(m-tolyl)phosphine, tris(o-tolyl)phosphine, tris(p-methoxyphenyl)phospine, tris(p-diemthylamino-phenyl)phosphine, tricyclohexylphosphine, tricyclopentylphosphine, triethylphosphine, tri(1-naphthyl)phosphine, tribenzylphosphine, tri-n-butylphosphine, tri-t-butylphosphine.

Phosphites: trimethyl phosphite, triethyl phosphite, tri-n-propyl phosphite, tri-1-propyl phosphite, tri-n-butyl phosphite, tri-1-butyl phosphite, tri-t-butyl phosphite, tris(2-ethylhexyl)phosphite, triphenyl phosphite, tris(2,4-di-t-butylphenyl)phosphite, tris(2-t-butyl-4-methoxyphenyl) phosphite, tris(2-t-butyl-4-methylphenyl)phosphite, tris(p-cresyl)phosphite.

Phosphonites: methyldiethoxyphosphine, phenyldimethoxyphosphine, phenyldiphenoxyphosphine, 2-phenoxy-2H-dibenz[c,e][1,2]oxaphosphorin and derivatives thereof in which the hydrogen atoms are completely or partly replaced by alkyl and/or aryl radicals or halogen atoms.

Customary phosphinite ligands are diphenyl(phenoxy) phosphine and derivatives thereof, diphenyl(methoxy)phosphine and diphenyl(ethoxy)phosphine.

Furthermore, the hydroformylation mixtures can comprise an acyl or heteroacyl phospshite or a ligand having an acyl phosphite or heteroacyl phosphite group as organophosphorus ligand. Acyl phosphites or ligands having acyl phosphite groups, their preparation and their use in hydroformylation are described, for example, in DE 100 53 272. Ligands having heteroacyl phosphites and heteroacyl phosphite groups, their preparation and their use in hydroformylation are described, for example, in DE 10 2004 013 514.

In the following, the method of the invention is described by way of example without the invention, whose scope of protection is defined by the claims and the description, being restricted thereto.

The method of the invention for separating off relatively high-boiling components from homogeneous catalysts or homogeneous catalyst systems by separation using membranes based on a polymer having intrinsic microporosity (PIM) will hereinafter be described by way of example for the rhodium complex-catalyzed hydroformylation of $C_4$-$C_{16}$-olefins.

As shown in FIG. 1, the starting materials (1) for the hydroformylation, viz. olefin and synthesis gas, are fed to the reactor (R). The hydroformylation of the olefin to aldehyde occurs in the presence of the catalyst system initially placed in the reactor. Reacted starting material such as aldehyde and by-products and subsequent products including high boilers such as aldol condensation products and unreacted starting material and also the catalyst system are discharged from the reactor as reaction mixture (2) and fed to a selective membrane separation step (M). The catalyst or the catalyst system is concentrated on the retentate side (3) and depleted on the permeate side (4).

Figure 2:
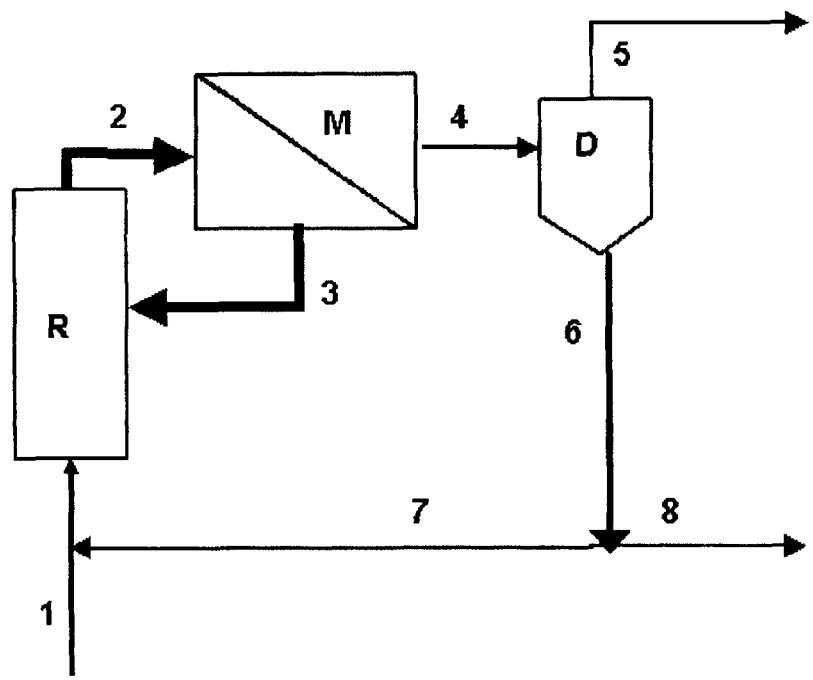
FIG. 2 is a block diagram showing an extension of the method shown in FIG. 1.

FIG. 2 shows an extension of the method shown in FIG. 1, in which the permeate (4) from the membrane separation step is fed to a thermal separation step (D). In the thermal separation step, the permeate stream (4) is separated into a stream (6) enriched in relatively high-boiling components such as by-products from the reaction section and also catalyst components which have not been retained in the membrane separation step and a product stream (5) containing lower-boiling components, predominantly aldehyde. To avoid accumulaton of relatively high-boiling by-products in the process, stream (6) or a substream (8) of stream (6) can be discharged from the process. If it is not necessary to discharge the entire stream (6), it can be advantageous to recirculate the remaining stream (7) to the reaction, particularly when stream (7) still contains part of the catalyst system.

Figure 3:
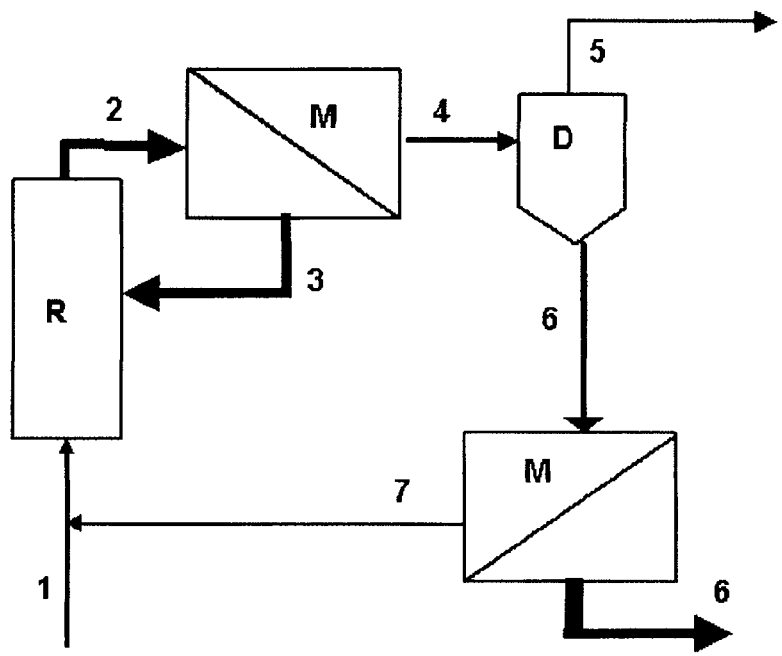
FIG. 3 is a block diagram showing a variation of the method shown in FIG. 2.

Depending on the values content of the stream (6) in terms of catalyst components, it can be advantageous to separate stream (6) by means of a second membrane separation step into a stream (7) which is enriched in catalyst compared to stream (6) and a corresponding catalyst-depleted stream (8) for discharge of high-boiling components (see FIG. 3). Depending on the activity of the catalyst concentrated in stream (7), it can be advantageous to feed this stream either directly or indirectly to the reaction.

Figure 4:
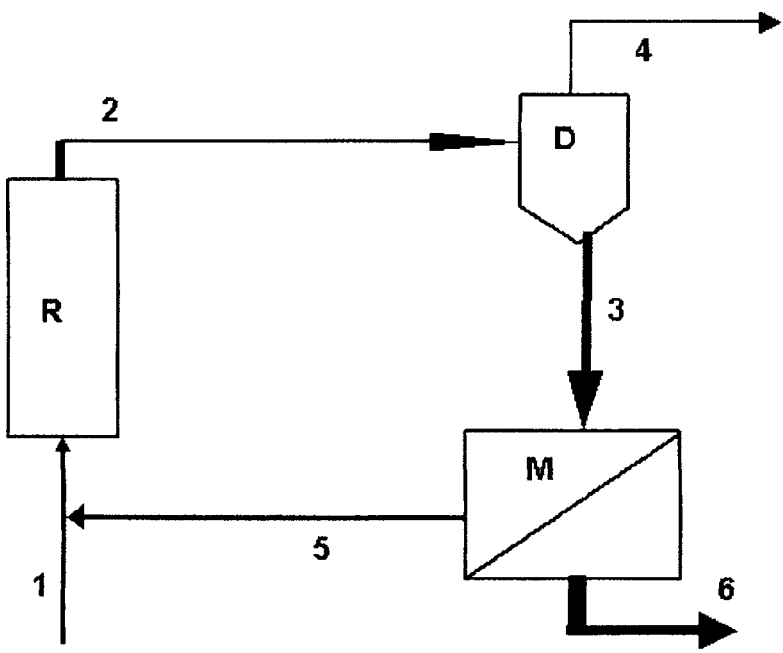
FIG. 4 is a block diagram showing another variation of the method shown in FIG. 2.

The arrangement as shown in FIG. 3 can be advantageous even without the membrane separation step after discharge from the reactor. Such an arrangement is shown in FIG. 4.

The invention further provides a process for preparing tridecanal, which comprises the following steps:
a. hydroformylation of tributene to tridecanal using a homogeneous catalyst system comprising rhodium and an organophosphorus compound,
b. separation of the reaction output by distillation into a distillate containing unreacted olefins and aldehydes and a bottom product containing high boilers and the catalyst system,
c. carrying out the inventive method of concentrating a homogeneous catalyst, where the high boilers as permeate and the catalyst system as retentate are separated from one another,
d. recirculation of the retentate with the concentrated catalyst system to the hydroformylation reactor.

In a preferred embodiment, tridecanal is prepared using a tributene which is prepared by oligomerization of linear butenes over nickel-containing solid catalysts.

In a particularly preferred embodiment, the organophosphorus compound is tris(2,4-di-tert-butylphenyl)phosphite.

Even without further details, it is assumed that a person skilled in the art can utilize the above description in its widest scope. The preferred embodiments and examples are therefore to be interpreted merely as descriptive disclosure which does not limit the invention in any way. The present invention is illustrated below with the aid of examples. Alternative embodiments of the present invention can be obtained in an analogous way.

EXAMPLES

Example According to the Invention

The separation task as per FIG. 4 which is the most demanding among the above arrangements for the membrane separation step because of the high proportion of high boilers was selected as example. The reaction is a rhodium-phosphite-catalyzed hydroformylation of a dodecene mixture (tri-n-butene). The rhodium precursor used is acetylacetonatodicarbonyl rhodium and the lignad used is a tris(2,4-di-tert-butylphenyl)phosphite. The rhodium concentration was 10 mg/kg. The rhodium to ligand ratio was 20. Reacted starting material such as the aldehyde (isotridecanal) and by-products and subsequent products including high boilers such as aldol condensation products and unreacted starting material and also the catalyst system are fed to a thermal separation step, the bottoms enriched in high boilers and in catalyst from which is fed to the membrane separation step. The proportion of high boilers is above 50%. The molar mass difference between active catalyst species and the high boilers is below 500 g/mol.

Figure 5:
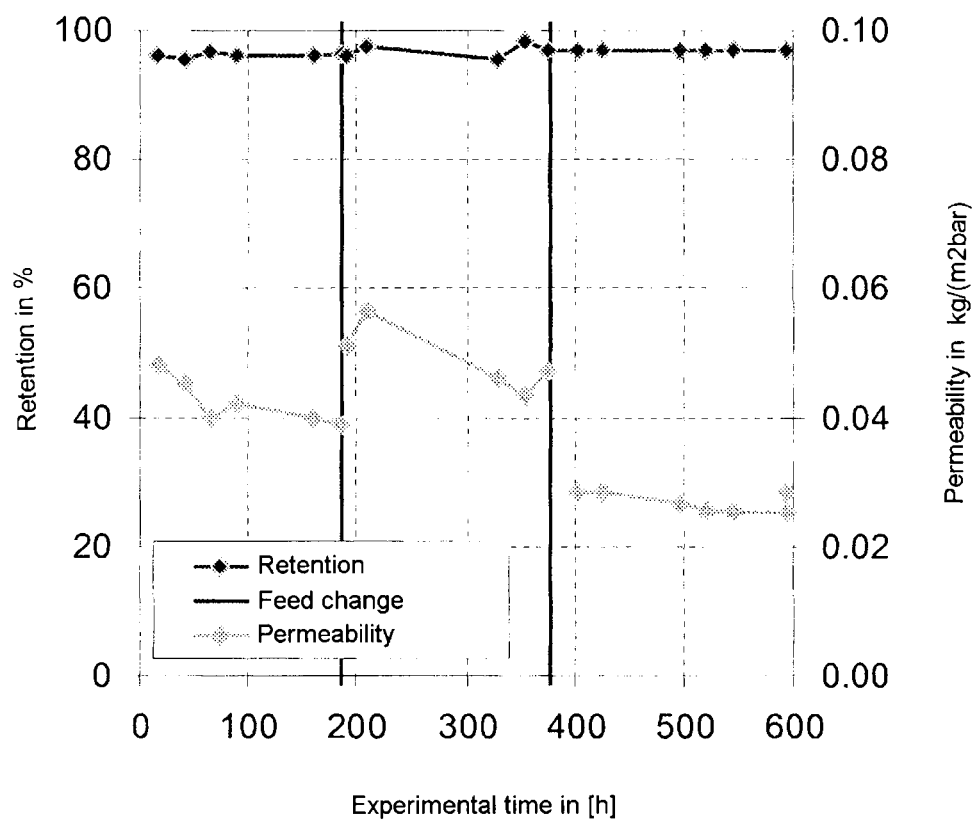
FIG. 5 is a graph showing rhodium retention as a function of time.

It was able to be shown by way of example that the rhodium retention in the high boiler stream when using a PIM membrane is above 95% (FIG. 5). The membrane filtration was, by way of example, carried out at a transmembrane pressure of 25 bar and a temperature of 60° C. The feed-side flow over the membrane was 1.7 m/s, the pressure drop over the tube was less than 1 bar, the Reynolds number was about 1200. This high retention was able to be observed for an experimental time of about 20 days. The permeate fluxes achieved are in the range from 0.63 to 1.41 kg/(m² h). The rhodium concentrations in the feed to the membrane separation step are in the range from 50 to 133 mg/kg.

Comparative Example

Experiments have shown that the method of DE 10 2005 060784 A1 cannot be employed for the separation task according to the method. The main reason is the insufficient sharpness of separation achieved by the membranes and membrane materials mentioned therein.

Tab. 1 shows the corresponding results for a selection of membrane types mentioned in DE 10 2005 060784 A1. The feed to the membrane separation step is, as in the example according to the method, a reactor output stream from the rhodium-phosphite-catalyzed hydroformylation of dodecene which has been enriched in high boilers by means of a thermal separation step. Accordingly, this stream comprises reacted starting material such as the aldehyde (isotridecanal) and by-products and subsequent products including high boilers such as aldol condensation products and unreacted starting materials and also the catalyst system. The ceramic membranes Inopor® and Velterop® display a good permeate flux but are far from being able to retain the catalyst system to a satisfactory extent. The polymer membranes have an increased retention for the catalyst compared to the ceramic membranes but this retention is still unsatisfactory. In addition, the polyimide membrane Starmem 240° has an unsuitably low permeability.

TABLE 1

| Manufacturer | Material | Rh feed [mg/kg] | Rh permeate [mg/kg] | Retention [%] | Flux [kg/(h*m²)] | TMP [bar] | Temp [° C.] |
|---|---|---|---|---|---|---|---|
| Inopor nano 0.9 nm | $TiO_2$ | 20 | 11 | 45.0 | 3.08 | 20 | 121 |
| Velterop 0.1 nm | $Al_2O_3$ | 77 | 62 | 19.5 | 11.42 | 15 | 150 |
| MET Starmem 240 | P1 | 120 | 62.5 | 47.9 | 0.29 | 30 | 90 |
| GMT oNF2 | PDMS | 120 | 27.5 | 77.1 | 1.74 | 25 | 60 |

TMP = transmembrane pressure

The examples show that considerably better concentration of the catalyst system compared to the methods of the prior art is possible by means of the method of the invention. Thus, the method can be carried out considerably more economically because of the higher degree of retention for the catalyst system. This applies particularly to catalyst systems containing valuable metals such as rhodium.

The invention claimed is:

1. A method of concentrating a dissolved solid homogeneous catalyst from a process stream comprising the homogeneous catalyst, the method comprising:

passing the process stream over at least one membrane, wherein the membrane comprising a polymer comprising at least one planar polymer unit, connected to one another via a rigid linker, with the linker being intrinsically twisted so that at least one first planar monomer unit is joined via the linker in a noncoplanar arrangement to at least one second planar polymer unit.

2. The method of claim 1, wherein the polymer has at least one spirobisindane bond which functions as a linker within a structure of the polymer.

3. The method of claim 1, wherein the polymer comprises at least one repeating unit selected from the group consisting of

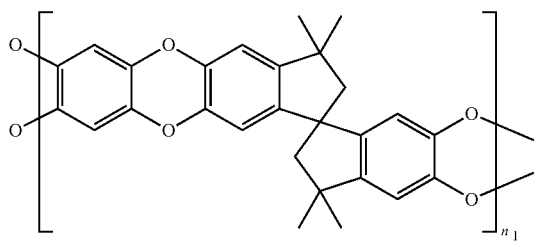

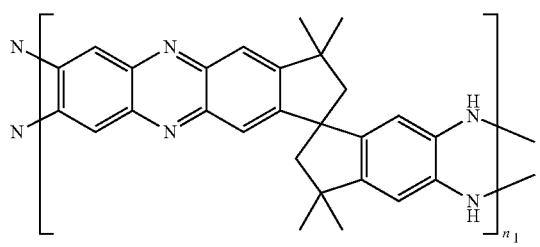

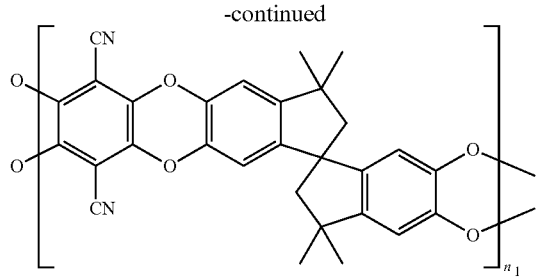

wherein n is in a range from 10 to 100,000.

4. The method of claim 1, wherein the homogeneous catalyst comprises one or more metal complexes.

5. The method of claim 1, wherein the process stream comprises at least one high boiler and at least one homogeneous catalyst from a homogeneously catalyzed organic reaction output of a reaction catalyzed by at least one organic metal complex, and wherein the at least one high boiler is separated off with a permeate and the catalyst system remains in a retentate.

6. The method of claim 1, carried out over at least one membrane having a separation limit of from 200 to 2000 g/mol.

7. The method of claim 1, carried out at a temperature of from 40 to 150° C.

8. The method of claim 1, carried out at a transmembrane pressure of from 0.5 to 6 MPa.

9. The method of claim 1, carried out in the presence of at least one selected from the group consisting of carbon monoxide and hydrogen.

10. The method of claim 1, carried out with from 1 to 3 membranes.

11. The method of claim 1, carried out with from 1 to 3 membrane separation processes.

12. The method of claim 1, wherein a proportion of high boilers in the process stream is from 50 to 98% by mass.

13. The method of claim 1, carried out without addition of a diluent.

14. The method of claim 1, wherein at least one homogeneous catalyst comprising at least one metal complex comprising at least one metal of group 4, 5, 6, 7, 8, 9, or 10 of the Periodic Table of the Elements and at least one organic ligand is separated from at least one high boiler.

15. The method of claim 14, wherein at least one metal complex catalyst comprising at least one organophosphorus compound is separated off from the high boilers.

16. The method of claim 15, wherein at least one metal complex catalyst, comprising rhodium and at least one organophosphorus compound, is separated off from the high boilers.

17. The method of claim 16, wherein the high boilers are separated off from a process stream of a hydroformylation mixture, wherein the hydroformylation mixture comprises high boilers, at least one complex catalyst comprising rhodium and a first organophosphorus compound, and at least one second organophosphorus compound.

18. The method of claim 1, wherein a separation layer thickness of the membrane is from 10 to 1000 nm.

\* \* \* \* \*